United States Patent [19]

Pokhodnya et al.

[11] 4,203,024

[45] May 13, 1980

[54] FLUX-CORED ELECTRODE FOR WELDING STEELS IN CARBON DIOXIDE

[75] Inventors: Igor K. Pokhodnya; Valery N. Shlepakov; Sergei A. Suprun, all of Kiev, U.S.S.R.

[73] Assignee: Institut Elektrosvarki Imeni E.O. Patona Akademii Nauk Ukrainskoi SSR, Kiev, U.S.S.R.

[21] Appl. No.: 886,039

[22] Filed: Mar. 13, 1978

Related U.S. Application Data

[63] Continuation of Ser. No. 708,609, Jul. 26, 1976, abandoned, which is a continuation of Ser. No. 589,847, Jul. 24, 1975, abandoned.

[51] Int. Cl.$^2$ ............................................. B23K 35/30
[52] U.S. Cl. ................................. 219/146.1; 219/74; 219/146.24; 219/146.3
[58] Field of Search ................. 219/146.1, 74, 146.24, 219/146.3, 146.41

[56] References Cited

U.S. PATENT DOCUMENTS

| | | | |
|---|---|---|---|
| 2,102,891 | 12/1937 | Faulkner | 219/146 |
| 3,466,417 | 9/1969 | Chapman | 219/146 X |
| 3,692,971 | 9/1972 | Kniekamp | 219/146 X |
| 3,733,458 | 5/1973 | Pokhodnya | 219/146 |
| 3,805,016 | 4/1974 | Soejima | 219/146 |

Primary Examiner—Richard R. Kucia
Attorney, Agent, or Firm—Holman & Stern

[57] ABSTRACT

A flux-cored electrode intended for arc welding of steels in carbon dioxide is characterized in having a casing of a low-carbon steel filled with a powder flux containing (in weight percent):

calcined magnesite: 4–8,
feldspar: 6–9,
calcium fluoride: 4–5.5,
titanium dioxide: 14–20,
ferromanganese: 6–10,
ferrosilicon: 1.5–3,
iron powder: the rest.

The flux-cored electrode is practicable if used in semi-automatic and automatic welding of metal structures from structural low-carbon and low-alloy steels and from steels of improved strength. The flux-cored electrode with the above chemical composition of the flux is conducive to reduced separation of fluoride gases harmful to welders, the high welding characteristics of the electrode remaining intact.

4 Claims, No Drawings

FLUX-CORED ELECTRODE FOR WELDING STEELS IN CARBON DIOXIDE

This is a continuation of application Ser. No. 708,609, filed July 26, 1976, which in turn is a continuation of Ser. No. 589,847, filed July 24, 1975, which are now abandoned.

BACKGROUND OF THE INVENTION

The present invention relates to electrode materials for welding and, more particularly, to wire electrodes for steel welding in carbon dioxide.

It is practicable to use the proposed flux-cored electrode for semi-automatic and automatic welding of metal structures made from structural low-carbon and low-alloy steels or from steels of improved strength.

French Pat. No. 1,173,590 discloses a wire electrode for welding steels in carbon dioxide in the form of a low-carbon steel casing filled with a power flux which has the following composition (weight percentage):
calcium fluoride: 16,
titanium dioxide: 31,
ferromanganese: 9,
ferrosilicon: 2,
iron powder: 42 (the rest).

While this flux-cored electrode combines advantages inherent in those of a rutile or calcium fluoride type, welding with this wire electrode results, however, in the separation of fluoride gases noxious to welders.

SUMMARY OF THE INVENTION

The primary object of the invention is a flux-cored electrode featuring a more limited separation of fluoride gases in the course of welding, compared with a similar separation typical of the known types of electrodes.

The object of the invention is accomplished in a flux-cored electrode for welding steels in carbon dioxide the electrode made as a casing from a low-carbon steel and filled with a powder charge containing calcium fluoride, titanium dioxide, ferromanganese, ferrosilicon, and iron powder, which, according to the invention, also contains 4–8% by weight calcined magnesite and 6–9% by weight feldspar, whereas the rest of the flux components are taken in the following ratio (weight percentage):
calcium fluoride: 4–5.5,
titanium dioxide 14–20,
ferromanganese: 6–10,
ferrosilicon: 1.5–3, iron powder: the rest.

The wire electrode of the above composition permits the welding of steels in carbon dioxide with limited separation of fluoride gases, the welding characteristics of the wire electrode remaining high.

To ensure weld joints free of porosity when welding a corroded or sintered metal, it is practicable to provide up to 2% by weight sodium fluosilicate in the powder flux.

DETAILED DESCRIPTION OF PREFERRED EMBODIMENT

Proposed is a wire electrode for welding steels in carbon dioxide, made as a casing from a low-carbon steel and filled with a powder flux composed of (in weight percent):
calcined magnesite: 4–8,
feldspar: 6–9,
calcium fluoride: 4–5.5,
titanium dioxide: 14–20,
ferromanganese: 6–10,
ferrosilicon: 1.5–3,
iron powder: the rest.

The above composition of the powder flux in a flux-cored electrode, according to the invention, ensures high mechanical and operational characteristics of a weld joint metal as well as a more limited separation of fluoride gases, as compared with the known wire electrode of the same type.

The provision of calcined magnesite below 4 weight percent does not permit a sharp reduction in the separation of fluoride gases, whereas the magnesite content above 8 weight percent results in a reduced yield of slag and poorer weld formation.

The provision of calcined magnesite combined with feldspar in the flux core of a wire electrode is conducive to a sharp reduction in the separation of fluoride gases, the welding characteristics of the electrode remaining high.

Better arcing stability and improved welding characteristics of the related operation are achieved, according to the invention, when the feldspar content in the wire electrode flux core amounts to 6–9 weight percent.

The provision of titanium dioxide in the wire electrode powder flux in the form of a rutile concentrate in a quantity higher than 14 weight percent is required for securing welding characteristics typical of wire electrodes of the rutile type. The titanium dioxide content above 20% by weight affects the refining properties of the slag.

The content of calcium fluoride above 5.5 weight percent affects the covering powder of the slag, whereas the calcium fluoride content below 4 weight percent does not ensure high refining characteristics of the slag, which are required for securing high mechanical properties of a seam and a weld joint.

The provision of 6–10% by weight ferromanganese with a manganese content of not less than 85% percent and of 1.5–3% by weight ferrosilicon with a silicon content of not less than 70% is necessitated by a required alloying capacity of a built-up metal for securing a weld joint metal with high mechanical and operational characteristics.

To ensure seams free of porosity when welding a corroded or sintered metal, the content of sodium fluosilicate in the proposed flux-cored electrode must be 2 weight percent; a higher content of sodium fluosilicate in the flux is not permissible, as this would result in an increased separation of fluoride gases.

High mechanical and operational characteristics of the weld joint metal, and limited separation of fluoride gases are ensured by the following composition of the flux components (in weight percent):
calcined magnesite: 4–8,
feldspar: 6–9,
calcium fluoride: 4–5.5,
titanium dioxide: 14–20,
ferrosilicon (with a silicon content of not less than 70%): 1.5–3,
sodium fluosilicate: 0–2,
ferromanganese (with a manganese content of not less than 85%): 6–10,
iron powder: the rest.

The advantages of the proposed wire electrode over the known ones can be seen from the following examples.

EXAMPLE 1

Proposed is a flux-cored electrode 2.5 mm in diameter, wherein a low-carbon steel casing made of a band accounts for 70% of the total weight of the electrode, whereas the powder flux contains 14.7% of titanium dioxide in the form of a rutile concentrate, 4% calcium fluoride in the form of a fluorite concentrate 7.7% calcined magnesite 6.7% feldspar, 8.6% ferromanganese with a 90% manganese content, 2.3% ferrosilicon with an 80% silicon content, and 56% iron powder.

Welding with such an electrode resulted in high welding and operational characteristics of the weld joint. The results of testing the mechanical characteristics of the seam and weld joint metal are furnished in Table 1.

The separation of fluoride gases was as follows: 20–65 mg/min silicon tetrafluoride and 35–50 mg/min hydrogen fluoride, which is 20–50 times less for silicon tetrafluoride and 1.5–2 times less for hydrogen fluoride, as compared with respective figures in the known wire electrode of the rutile-fluorite type according to the abovementioned French patent.

EXAMPLE 2

Proposed is a flux-cored electrode 2.2 mm in diameter, wherein a low-carbon steel casing made of a band accounts for 74% of the total weight of the electrode, while a powder flux contained, by weight 16% titanium dioxide in the form of a rutile concentrate, 5.5% calcium fluoride in the form of fluorite 7.8% calcined magnesite 7.3% feldspar 7.3, 7.4% ferromanganese with a 90% manganese content, 1.8ferrosilicon with an 80% silicon content and 54.3% iron powder.

Welding with such an electrode ensured well formed fillet and butt welds, easy separation of slag crust, limited splashing of metal and slag, as well as limited separation of fluoride gases.

EXAMPLE 3

Proposed is a flux-cored electrode 2.5 mm in diameter, wherein a low-carbon steel casing accounts for 72% of the total weight of the wire electrode, while the flux contained by 17.7% titanium dioxide, 4.8% calcium fluoride 4.4% calcined magnesite 8% feldspar, 1.4% sodium fluosilicate 6.8% ferromanganese with a 90% manganese content 2.2%, ferrosilicon with a 80% silicon content and the balance being iron powder.

Welding with such an electrode ensured welds with high welding characteristics. Also, in the welding of a corroded or sintered metal, welds were free of porosity.

The welding of a butt joint from a low-carbon steel resulted in the following mechanical characteristics of the metal of the seam and weld joint: yield limit of 45–48 kg/mm$^2$, resistance to rupture of 54–56 kg/mm$^2$, relative elongation of 26–30%, and resilience at a test temperature of +20° C. of 19–23 kgm/cm$^2$.

The efficiency of welding with such a wire electrode exceeds 2–2.5 times that of welding with a coated electrode of the calcium fluoride type, 4–5 mm in diameter, and is equivalent to the efficiency of welding with a wire electrode of the rutile-fluorite type.

The separation of fluoride gases was as follows: 45–130 mg/min silicon tetrafluoride and 30–100 mg/min hydrogen fluoride.

The proposed flux-cored electrode of the above chemical composition helps ensure a limited separation of fluoride gases harmful to welders, as compared with that typical of the known electrode of such type, the mechanical and operational characteristics of the weld joint metal remaining high.

What we claim is

1. A flux-cored electrode for welding steels in carbon dioxide, made as a casing from a low-carbon steel and filled with a powder flux consisting essentially of, by weight:

4–8% calcined magnesite,
6–9% feldspar,
4–5.5% calcium fluoride,
14–20% titanium dioxide,
6–10% ferromanganese,
0–2% sodium fluosilicate,
1.5–3% ferrosilicon
and the balance being iron powder.

2. The flux-cored electrode as claimed in claim 1 wherein the flux powder consists of, by weight:

7.7% calcined magnesite,
6.7% feldspar,
4% calcium fluoride,
14.7% titanium dioxide,
8.6% ferromanganese, Table 1

| Steel to be welded | Yield limit kg/mm$^2$ | Resistance to rupture kg/mm$^2$ | Relative elongation, % | Relative reduction, % | Resilience in kgm/cm$^2$ at a test temperature, °C. | | | |
|---|---|---|---|---|---|---|---|---|
| | | | | | +20 | −20 | −40 | −60 |
| Low-carbon structural steel | 39.2–39.9 39.4 | 50.1–50.4 50.2 | 31.3–31.3 31.3 | 64–71.3 67.1 | 15.0–15.1 15.0 | 14.1–14.4 14.3 | 10.6–16.6 13.6 | 7.9–11.2 9.5 |
| Low-carbon steel with a manganese content of 1.2–1.7% | 47.9–48.8 48.3 | 57.9–59.5 58.7 | 23.3–24.6 23.9 | 66–67.1 66.6 | 15.6–17.1 16.3 | 12.8–13.1 12.9 | 4.4–14.9 10.0 | 7.5–9.5 8.7 |
| Low-carbon steel with a silicon content of 0.3–0.6% and that of manganese 1.4–1.8% | 42.4–44.1 43.2 | 52.6–55.1 53.7 | 24.3–32 27.3 | 41.2–69.8 54.7 | 17.7–19.0 18.3 | 15.3–15.6 15.4 | 12.0–14.2 13.0 | 9.5–13.0 10.4 |

Welding current 400–440 A, arc voltage 28–30 V 2.3% ferrosilicon
and the balance being iron powder.

3. The flux-cored electrode as claimed in claim 1 wherein the flux powder consists of, by weight:
7.8% calcined magnesite,
7.3% feldspar,
5.5% calcium fluoride,
16% titanium dioxide,
7.4% ferromanganese,
1.8% ferrosilicon
and the balance being iron powder.

4. The flux-cored electrode as claimed in claim 1 wherein the flux powder consists of, by weight:
4.4% calcined magnesite,
8% feldspar,
4.8% calcium fluoride,
17.7% titanium dioxide,
6.8% ferromanganese,
1.4% sodium fluosilicate,
2.2% ferrosilicon
and the balance being iron powder.

* * * * *